(12) United States Patent
Curry et al.

(10) Patent No.: US 8,786,614 B2
(45) Date of Patent: *Jul. 22, 2014

(54) CHAINING IMAGE-PROCESSING FUNCTIONS ON A SIMD PROCESSOR

(71) Applicant: Calos Fund Limited Liability Company, Dover, DE (US)

(72) Inventors: Donald James Curry, Menlo Park, CA (US); Ujval J. Kapasi, San Jose, CA (US)

(73) Assignee: Calos Fund Limited Liability Company, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/886,220

(22) Filed: May 2, 2013

(65) Prior Publication Data

US 2013/0241940 A1 Sep. 19, 2013

Related U.S. Application Data

(63) Continuation of application No. 12/687,010, filed on Jan. 13, 2010, now Pat. No. 8,456,480.

(60) Provisional application No. 61/144,700, filed on Jan. 14, 2009.

(51) Int. Cl.
*G06F 15/00* (2006.01)

(52) U.S. Cl.
USPC ........... 345/501; 345/502; 345/503; 345/504; 345/505; 345/506

(58) Field of Classification Search
USPC .................................................. 345/501–506
See application file for complete search history.

(56) References Cited

U.S. PATENT DOCUMENTS

| | | | |
|---|---|---|---|
| 7,053,895 B2 * | 5/2006 | Yamagata et al. | 345/428 |
| 7,594,095 B1 | 9/2009 | Nordquist | |
| 2010/0158408 A1 * | 6/2010 | El-Mahdy et al. | 382/279 |

* cited by examiner

*Primary Examiner* — Ke Xiao
*Assistant Examiner* — Kim-Thanh T Tran

(57) ABSTRACT

In a single-instruction-multiple-data (SIMD) processor having multiple lanes, and local memory dedicated to each lane, a method of processing an image is disclosed. The method comprises mapping consecutive rasters of the image to consecutive lanes such that groups of consecutive rasters form image strips, and vertical stacks of strips comprise strip columns. Local memory allocates memory to the image strips. A sequence of functions is processed for execution on the SIMD processor in a pipeline implementation, such that the pipeline loops over portions of the image in multiple iterations, and intermediate data processed during the functions is stored in the local memory. Data associated with the image is traversed by first processing image strips from top to bottom in a leftmost strip column, then progressing to each adjacent unprocessed strip column.

20 Claims, 5 Drawing Sheets

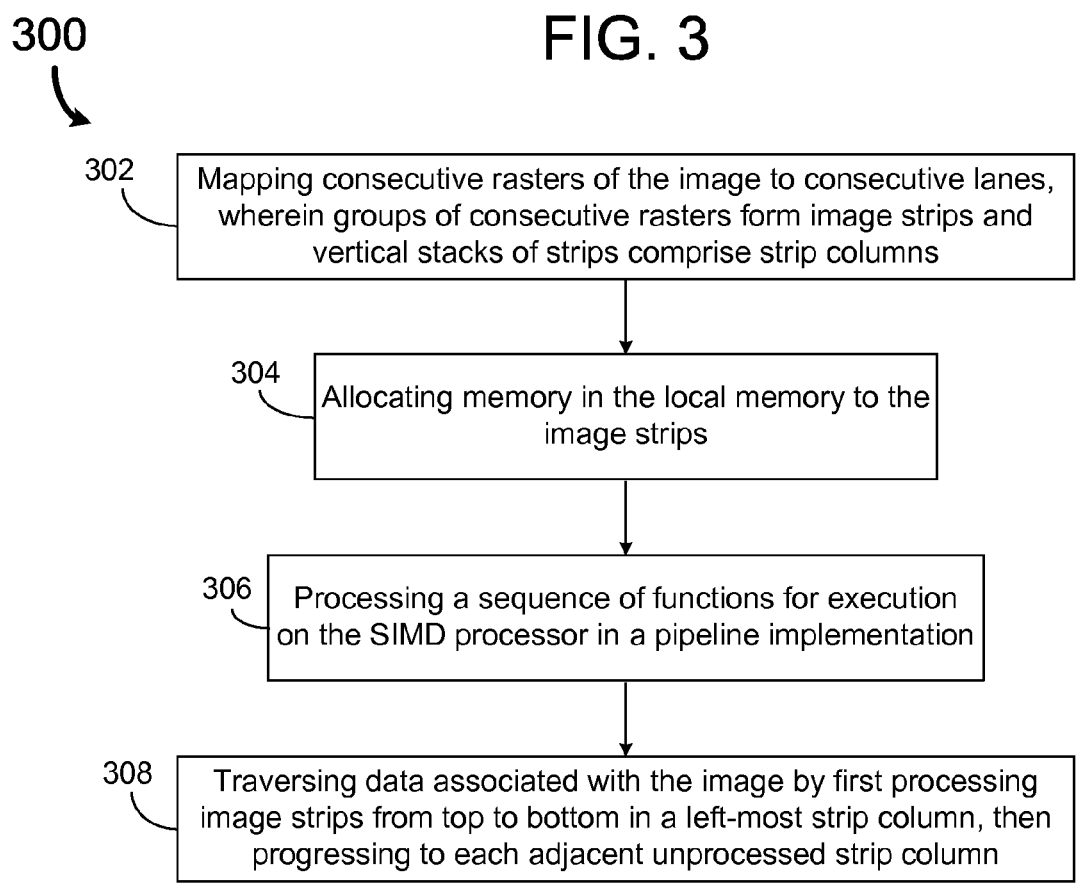

CHAINING IMAGE-PROCESSING FUNCTIONS ON A SIMD PROCESSOR

RELATED APPLICATIONS

This application is a continuation of U.S. patent application Ser. No. 12/687,010 filed Jan. 13, 2010, entitled METHOD FOR CHAINING IMAGE-PROCESSING FUNCTIONS ON A SIMD PROCESSOR, which claims benefit of priority to Provisional U.S. Patent Application No. 61/144,700 filed Jan. 14, 2009, entitled METHOD FOR CHAINING IMAGE-PROCESSING FUNCTIONS ON A SIMD PROCESSOR. The aforementioned priority applications are hereby incorporated by reference in their entireties.

TECHNICAL FIELD

The disclosure herein relates to methods and apparatus for parallel processing, and more particularly image processing methods for single-instruction-multiple-data (SIMD) processing environments.

BACKGROUND

An image processing function, or kernel, that implements a point operation on an image can be easily mapped to a SIMD processor and efficiently chained. This is because the order of the pixels presented to each SIMD processor is unimportant since each result pixel only depends on one source pixel.

Many image processing kernel functions, however, determine neighboring context to generate an output pixel value. To calculate the new value of a pixel, the kernel often reads surrounding pixel values. Many ways exist to map such kernels to a SIMD processor, where each mapping uses a different partitioning of data among the SIMD processing lanes or traverses the data in a different order. Usually, performance optimized mappings vary based on the underlying algorithms being implemented, which is partly why such a diversity of implementation strategies abound. Because of these differences, image processing kernels cannot be guaranteed to easily chain together without "glue logic" that transposes data between SIMD processing lanes or via an extra global memory transfer. This both reduces performance and lowers productivity.

While existing solutions allegedly work adequately for their intended applications, they are often inflexible in accommodating a large set of image processing algorithms, especially when little to no loss of performance is desired. Thus, improved mapping methods and apparatuses for image processing in SIMD processors are described herein.

BRIEF DESCRIPTION OF THE DRAWINGS

Embodiments of the present disclosure are illustrated by way of example, and not by way of limitation, in the figures of the accompanying drawings and in which like reference numerals refer to similar elements and in which:

FIG. 3 displays a flowchart illustrating steps employed in one embodiment of the raster-per-lane method;

DETAILED DESCRIPTION OF PREFERRED EMBODIMENTS

Figure 1:
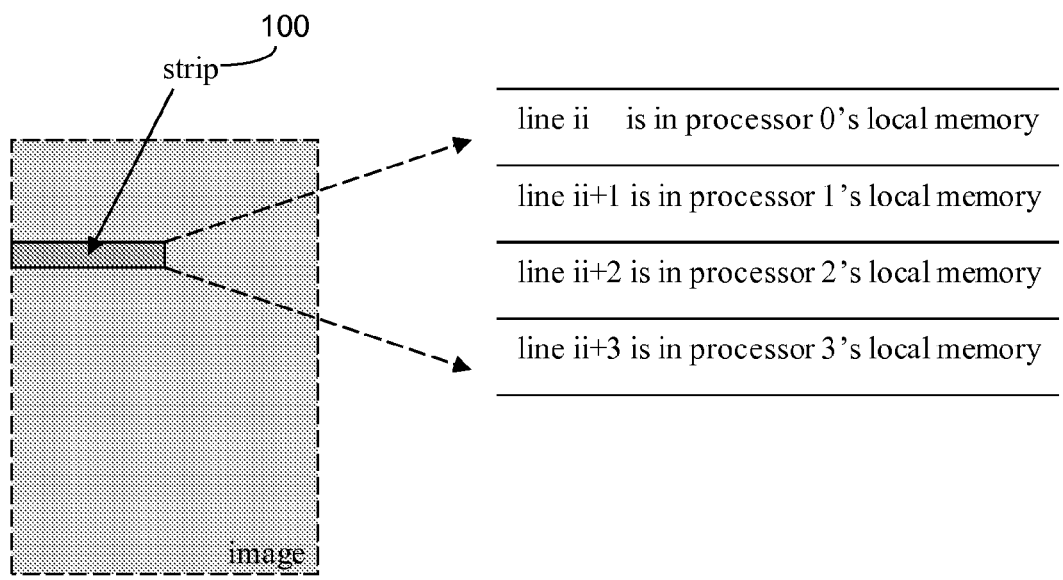
FIG. 1 illustrates data partitioning of an image strip in accordance with one embodiment of the raster-per-lane method described herein.

Embodiments described herein provide a system and a method for implementing image processing functions on SIMD processors that allows for straightforward and high-performance chaining of consecutive processing functions. A method, such as described, called raster-per-lane (RPL), achieves its results by precisely constraining both the data partitioning among SIMD processors and the data traversal order. Advantages of certain embodiments of this method may include: (1) functions can be chained together to process images without intermediate trips to external memory or "glue logic" to reorganize intermediate pixel data thereby improving performance; and (2) each function can be implemented separately (possibly by independent parties) in a modular fashion and then combined easily.

SIMD Architecture Overview

A SIMD architecture typically consists of multiple processing lanes that all execute the same operations but on different data. Throughout this document including any code listings, N or NUM_LANES, refers to the number of lanes. The lanes each have a fast local private memory, and all the lanes share an interface to a slower global memory. Typically, the private memory is on-chip SRAM (e.g., on the order of 16 KB per lane), and the global memory is off-chip DRAM (on the order of 1 GB shared by all of the lanes). DMA engines often manage transfers to and from global memory. An example of a SIMD architecture is the stream architecture.

SIMD processors execute functions known as kernels. Each kernel implements an image processing algorithm, such as pixel color conversion, scaling, or filtering. Its arguments include scalars as well as streams, which are designations of pre-allocated regions of local private memory where input data can be read and output data can be written by each SIMD lane.

A sequence of kernels that process input image(s) to generate output image(s) is known as a kernel processing graph (or simply kernel graph). Generally, the outputs of one kernel will directly feed the inputs of another. There can be diverging and merging dataflows between kernels. Also, kernels may have multiple inputs and/or outputs.

A kernel graph may be implemented as a pipeline, where chained kernels usually pass data through streams allocated in on-chip local memory. Since only a portion of an input image resides in local memory, pipelines typically loop over an input image, processing a bit of the image during each iteration of the loop. An iteration typically transfers data from external memory to local memory, calls each kernel in the pipeline, then passes data back from local to external memory. Basically, a pipeline implements a portion of a kernel graph in an optimized fashion where the source originates in global memory and the output is stored back to global memory, but all intermediate data is stored in local memory.

Often, especially in embedded computer systems, an entire image cannot fit into the available global memory—for instance, in imaging applications that process 8 inch by 11 inch or larger pages that are sampled at 1200 dots per inch (dpi) in color. These images are processing incrementally, with a portion of the image in a memory buffer at any given time. Usually the image is processed in sections from top to bottom. Each section is referred to as an incremental buffer and contains some number of lines of the image, with the exact number dependent on the amount of available memory and the type of processing required.

Throughout the disclosure herein, two types of code are shown in various examples: control code and kernel code. The control code runs on a scalar processor that is responsible for coarse grain control of the SIMD lanes and of the DMA engines. Often, this can just be the first SIMD processor, depending on the exact architecture. Kernel code, on the other hand, is executed in lockstep across all SIMD lanes in parallel, with the exact same code running on each lane but with different data. The disclosure herein presents control code in "C" language syntax with an extension for the stream datatype as provided in the StreamC language syntax. Note: allocation for stream data in local memory may be performed statically for optimal performance; however, for simplicity, this disclosure assumes that stream data are allocated dynamically. Kernel code is presented completely in the "StreamC" language syntax. Additionally, all kernel code is contained in functions declared with the kernel keyword.

The raster-per-lane method described herein maps consecutive lines, or rasters, of an image to each of N parallel processor lanes. With reference to FIG. 1, a group of N consecutive lines forms an image strip 100. An image strip (or simply strip) is an area of image pixels with a height equal to N and a width which is less than or equal to the width of the image. Importantly, a strip resides in local on-chip memory. Within a kernel function, each lane reads and writes pixels from the line in their private memory. The entire strip is processed in parallel from left to right.

Figure 2:
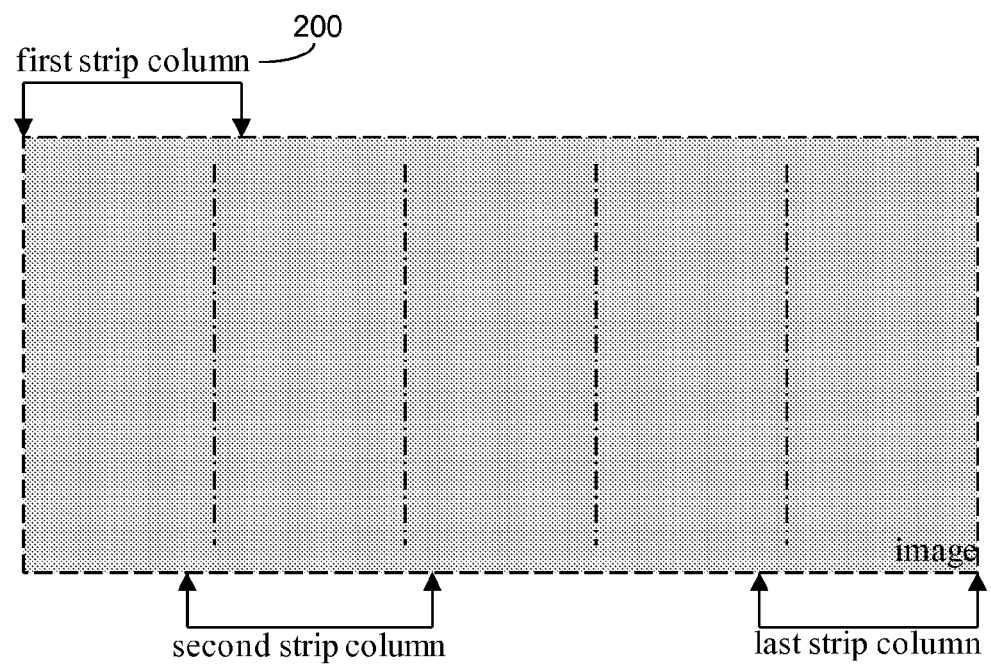
FIG. 2 illustrates data partitioning of strip columns in accordance with one embodiment of the raster-per-lane method described herein.

Referring now to FIG. 2, a strip column 200 consists of a vertical stack of strips, usually equal to the height of the image. If the width of a strip is narrower than the width of the image, then the full set of strip columns will completely cover the image with a small amount of horizontal overlap at interior edges. The data traversal order in the RPL method is to process the strips in a strip column from top to bottom, and then the strip columns from left to right.

FIG. 3 illustrates one embodiment of the RPL method, generally designated 300. The method begins, at 302, by mapping consecutive rasters of the image to consecutive lanes of the SIMD processor. In one embodiment, the consecutive rasters comprise vertically consecutive line segments of the image. Groups of consecutive rasters form image strips, while vertical stacks of strips define strip columns. The method continues, at 304, by allocating memory in the local memory to the image strips. A sequence of functions is then processed, at 306, for execution on the SIMD processor in a pipeline implementation. The pipeline looping over the portions of the image in multiple iterations, such that intermediate data processed during the functions is stored in the local memory. The method proceeds by traversing data associated with the image, at 308, by first processing image strips from top to bottom in a left-most strip column, then progressing to each adjacent unprocessed strip column.

Application Programming Interface

A programmer can use the following APIs to implement the RPL data partitioning and RPL data traversal order for their kernel functions and pipelines.

To access neighboring vertical context in an image, a row tap function may be used from within a kernel. Exemplary code is shown below:

```
typedef struct row_tap_3_t_ { int ti; int c0; int bl; } row_tap_3_t;
inline kernel void    row_tap_3_init_controls (
    int     offset(in), // Additional offset: 0 <= offset <=
            (NUM_LANES+1-width)
    int     scn0(in),
    int     scns(in),
    vec     row_tap_3_t vpc0(out),
    vec     row_tap_3_t vpc1(out)
) ;
inline kernel vec row_tap_3_t    row_tap_3_get_taps (
    vec    row_tap_3_t    vpc0 (in) ,
    vec    row_tap_3_t    vpc1 (in) ,
    vec    int            prv (in) ,
    vec    int            src (in)
) ;
```

The code above relates to an example for a 3-high filter. Generating APIs for filters of other sizes is relatively straightforward. The row tap__3 init controls inline kernel is called once before entering the main kernel loop. The function initializes a pair of control structures that are used with the function row_tap__3_get_taps to extract the vertical context needed by each lane from vectors read from the current and previous strips. The controls take into account where the strips are in the overall frame so that the top and bottom edges are handled properly.

A kernel_state_t API provides access to the parameters and storage that is specific to a kernel. Code for an exemplary datatype is shown below for a kernel that processes data from a single input image and produces data for a single output image; requires less than NUM_LANES of vertical context, and has no other input requirements such as look-up tables or programmable filter coefficients. More complex kernels may seek additional private data and should use a datatype similar to kernel_state_t, but customized for that particular kernel.

The fields in kernel_state_t allow the user to access a satisfactory amount of vertical and horizontal context. The datatype also holds a reference to the history strip used by the kernel to maintain vertical context from one strip to the next. The two additional fields provide a place to save this history buffer between pipeline calls when processing incremental buffers. The exemplary code reads:

```
typedef struct {
    int         context_width;
    int         context_height;
    int         context_height_extra;
    strip_t     history;
    image_t     prv; // for incremental
    image_t     nxt; // for incremental
} kernel_rec_t;
typedef kernel_rec_t *kernel_state_t;
kernel_state_t kernel_state_new(
    int         image_format,
    int         image_width,
```

```
          int          context_width,
          int          context_height,
          int          context_height_extra,
          strip_t      history,
          image_t      prv, // for processing incremental buffers
          image_t      nxt // for processing incremental buffer
);
void         kernel_state_free (kernel_state_t kk);
int          kernel_state_get_context_width          (kernel_state_t kk);
int          kernel_state_get_context_height         (kernel_state_t kk);
int          kernel_state_get_context_height_extra   (kernel_state_t kk);
strip_t      kernel_state_get_history_strip          (kernel_state_t kk);
void         kernel_state_set_history_strip          (kernel_state_t kk, strip_t ss);
// For incremental buffers
void         kernel_state_load_history       (kernel state t kk);
void         kernel_state_store_history      (kernel state t kk);
image_t      kernel_state_get_prv_buffer     (kernel state t kk);
image_t      kernel_state_get_nxt_buffer     (kernel state t kk);
void         kernel_state_done               (kernel state t kk);
```

The API also provides a strip_t datatype that represents an image strip in local memory. Associated functions are used to load data from global memory into the local memory and to store it back out to global memory. Kernel interfaces also operate on strips and produce strips. Each strip has a scalar line0 argument associated with it which is the y position of the strip in some overall frame. It also holds the height of this frame in its lines parameter. The height of the strip itself is always fixed at NUM_LANES. It is ok for strips to have negative line0s as well as line0s larger than lines. A negative value for line0 means that the top line of the input stream aligns above the upper boundary of the image. All the horizontal offsets and widths for the strip are isolated in the column element. Exemplary code reads:

```
typedef struct {
        stream_t       stream;    // type, LRF_location, max_size
        strip_column_t column;    // horizontal position and size
        int            line0;     // vertical position in frame
        int            lines;     // vertical heightof frame
} strip_rec_t;
typedef strip_rec_t *strip_t;
strip_t          strip_new (strip_column_t column, int lines);
void             strip_free          (strip_t strip);
void             strip_load          (strip_t strip, image_t image, int line);
void             strip_store         (strip_t strip, image_t image);
stream_t         strip_get_stream    (strip_t strip);
strip_column_t   strip_get_column    (strip_t strip);
int              strip_get_line0     (strip_t strip);
int              strip_get_lines     (strip_t strip);
```

A strip_column_t datatype is provided in the API to hold the data describing the horizontal offsets and widths for a vertical stack of strips in an image. The functions that operate on this datatype provide access to key DMA load and store parameters for every strip within this column (i.e., load width, load offset, etc.). Additionally, the strip_column_next function should be called after processing each column, as it updates the fields within the strip_column_t data structure with the necessary parameters for the next column to process. For convenience, a pointer to a common strip_column_t is shared by the strips. As an example, relevant code may read:

```
typedef struct {
        int rem_width;
        int image_width;
        int strip_width_max;
        int overlap;
        int load_src_width;
        int load_src_offset;
        int store_dst_width;
        int store_dst_offset;
        int store_src_offset;
} strip_column_rec_t;
typedef strip_column_rec_t *strip_column_t;
strip_column_t strip_colunm_new (
        int image_width,
        int strip_width_max,
        int overlap
);
void    strip_colunm_free (strip_column_t column);
void    strip_column_next (strip_column_t column);
// Used by strip load from external to internal memory
int     strip_colunm_get_load_width(      strip_column_t column);
int     strip_column_get_load_src_offset ( strip_column_t column);
// Used by strip store from internal to external memory
int     strip_column_get_store_width(     strip_column_t column);
int     strip_column_get_store_src_offset   (strip_column_t column);
int     strip_column_get_store_dst_offset   (strip_column_t column);
int     strip_colunm_valid (strip_column_t column);
```

Figure 4A:
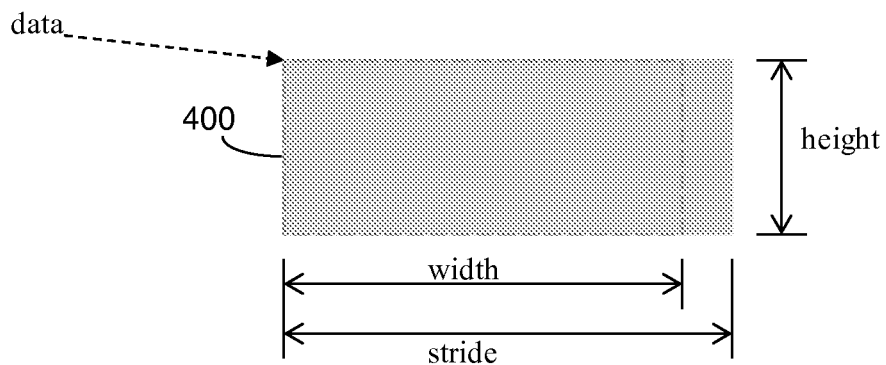
FIG. 4a illustrates an image datatype mapping for a buffer in global memory that contains image data.
Figure 4B:
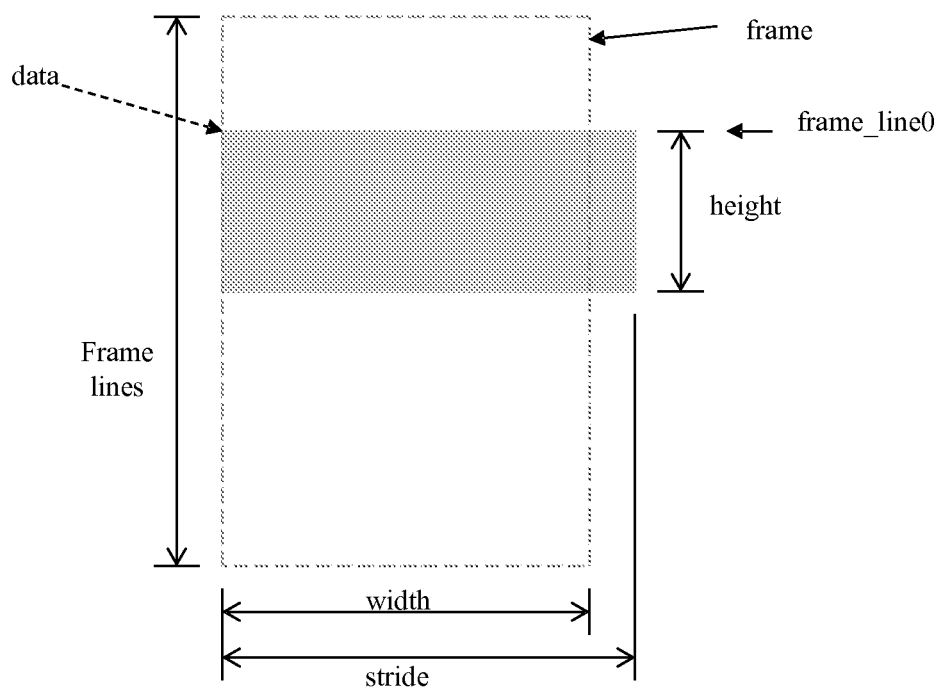
FIG. 4b shows an image datatype mapping similar to FIG. 4a, but in a larger frame context.

An image_t datatype keeps track of various useful parameters for a buffer in global memory that contains image data. With reference to FIG. 4a, it contains the dimensions of the active image area 400, how the image data is organized in the memory buffer (height, width and stride), and as shown in FIG. 4b, if processing incremental buffers, it also contains the incremental buffer's position within the larger image (or frame). Relevant coding examples may read:

```
typedef struct {
        int      width;
        int      height;
        int      stride;
        int      frame_line0;
        int      frame_lines;
        uint8_t *  data;
} image_rec_t;
typedef image_rec_t *image_t;
image_t image_new (
        int      width,
        int      height,
        int      stride,
        int      frame_line0,
        int      frame_lines,
        uint8_t *  data
);
void       image_free (image_t);
int        image_get_width (          image_t img);
int        image_get_height (         image_t img);
int        image_get_stride (         image_t img);
uint8_t *  image_get_data (           image_t img);
int        image_get_frame_lines (    image_t img);
int        image_get_frame_line0 (    image_t img);
int        image_get_frame_line1 (    image_t img, int
                                      context_height);
```

Pipeline Example

The following pipeline example uses the above APIs to chain together two kernel functions to operate on an entire image, where the intermediate data produced by the first kernel, foo, is consumed directly by the second kernel, bar, without being saved in global memory.

```
1   void
2   foobar_pipe(
3       kernel_state_t foo,
4       kernel_state_t bar,
5       image_t src,
6       image_t dst)
7   {
8       // defined manually based on local memory size
9       int strip_width_max = MAX_FOOBAR_STRIP_WIDTH;
10
11      int context_width = kernel_state_get_context_width (foo) +
12                          kernel_state_get_context_width (bar);
13
14      int context_height = kernel_state_get_context_height (foo) +
15                           kernel_state_get_context_height (bar);
16
17      strip_column_t column = strip_column_new (
18                          image_get_width(src),
19                          strip_width_max,
20                          context_width);
21
22      int    lines  = image_get_frame_lines (src);
23      int    line0  = image_get_frame_line0 (src);
24      int    line1  = image_get_frame_line1 (src, context_height);
25      int    line;
26      strip_t tmp_strip  = strip_new (column, lines);
27
28      kernel_state_set_history_strip (foo, strip_new (column,
            NUM_LANES) );
29      kernel_state_set_history_strip (bar, strip_new (column,
            NUM_LANES) );
30
31      while (column_valid(column))
32      {
33          for (line=line0; line<line1; line=line+NUM_LANES)
34          {
35              strip_load (        tmp_strip, src, line0);
36              foo_function ( foo,  tmp_strip, tmp_strip);
37              bar_function ( bar,  tmp_strip, tmp_strip);
38              strip_store (        tmp_strip, dst);
39          }
40          strip_column_next(column);
41      }
42
43      strip_free (tmp_strip);
44      strip_free (kernel_state_get_history_strip (foo);
45      strip_free (kernel_state_get_history_strip (bar);
46      strip_column_free (column)
```

Referring to the lines of code above, the kernel_state API is used in lines 11-15 to compute the overall pipeline vertical and horizontal context requirements by summing the contributions from each kernel. Lines 17-21 compute a new strip_column using the computed horizontal overlap requirement (context_width), strip_width_max and the image width. The next 3 statements extract the frame height (lines), the starting line number of the image buffer (line0) and the main loop termination limit (line1) given the overall vertical context required by the pipeline (context_height). The next statement allocates a new tmp_strip which will serve as the common input/output strip for the kernels. The next 2 statements allocate and set private history strips for the two kernels. The outer while loop is executed once for each column. The last statement of this loop is the required strip_column_next call. The inner for loop gets called for each strip in the column. The strip_load call initializes the tmp_strip with the image data for the current source column_strip. Each of the kernel calls uses this tmp_strip as both the source and destination strip (in practical implementations, multiple strips are often used to increase parallelism between loads from global memory, stores to global memory, and kernel processing). The vertical line0 associated with tmp_strip is updated by each kernel based on the delay being introduced. When the tmp_strip is stored, this internal line0 is used to position the strip in the output image. The private management of each kernel's history strip is carried on inside the foo_function or bar_function functions.

Note that in the pipeline described above, all transfers with global memory and all processing steps are in units of strips. In contrast, within a kernel function, all accesses and processing steps are in units of pixels.

As alluded to earlier, strips are the unit of processing with kernels accepting source strip(s) in local memory and then producing new destination strip(s) of the same size in local memory. In other embodiments, kernels may be provided that perform arbitrary scaling and controlled handling to ensure that the input and output are quantized to units of strips.

As additional kernels are chained together in longer pipelines, more local memory is allocated to maintaining vertical context strips for each kernel. This reduces the maximum strip width that can be processed.

When the maximum strip width is less than the image width, the image is broken up into multiple overlapping columns of strips. The pipeline is run on all of the strips in the first column, restarted at the top of the next column, and so on until all of the columns are processed.

The strip_column API isolates the computations involved in producing slightly overlapping strip columns. The function strip_column_new takes the image width in words, the maximum strip width manageable and the total edge context words needed and produces a strip_column record with all the horizontal sizes and offsets needed by the kernels, loads and stores.

The left edge of the first strip column and the right edge of the last column will be handled correctly because each kernel assumes the left edge of each strip aligns with the left edge of the image and similarly for the right edge. However, this also means that a few of the pixels at the interior strip edges may be incorrect. The strip_column API accounts for this and will setup the store parameters to only store the valid set of pixels back to global memory. For example, one embodiment includes generating pixels outside the left and right image boundaries by requiring kernels to assign an input line as the full width of the image and loading extra horizontal context for internal vertical edges and selectively storing valid data back to a global memory.

Each kernel operates to avoid introducing any horizontal phase error and (except for scaling) produces the same size strip as the source. The vertical phase shift introduced by each kernel is recorded by each kernel in the output strip line0. This line0, along with the horizontal offsets and sizes of the strip's column data are used by the store at the end of the chained kernels to position the output strip correctly in the output image.

The foo_function and bar_function that are used above are wrappers around the actual kernel code. They are used to simplify the pipeline code and to emphasize the modularity of the chained kernels. In the example implementation of foo_function below, the strip and kernel_state APIs are used to extract the more primitive arguments used directly by the actual kernel. (Many kernels will require a more complex datatype than kernel_state_t in order to manage additional private state such as tables, etc.). Examples are provided below:

```
void
foo_function (
        kernel_state_t kk,
        strip_t src,
        strip_t dst)
{
    int dst_line0 =    strip_get_line0 (src) –
                       kernel_state_get_context_height (kk) –
                       kernel_state_get_context_height_extra (kk);
    foo_kernel (
        kernel_state_get_context_height_extra (kk),
        strip_get_line0 (src),
        strip_get_lines (src),
        strip_column_get_load_width ( strip_get_column (src) ),
        strip_get_stream (src),
        strip_get_stream (kernel_state_get_history_strip (kk) ),
        strip_get_stream (kernel_state_get_history_strip (kk) ),
        strip_get_stream (dst)
    );
    strip_set_line0 (dst, dst_line0);
}
```

Kernel Interface

Although individual kernels may have additional arguments specific to their function, the nominal kernel interface used above may be illustrated by the following:

```
kernel void foo_kernel(
        int     offset (in),         // optional - added scan line delay
        int     line0 (in),          // lane 0 source line
        int     lines (in),          // scan lines in overall frame
        int     words (in),          // words to process
        stream pixel_type src_stm (seq_in),  // source stream
        stream pixel_type prv_stm (seq_in),  // previous src data in
        stream pixel_type nxt_stm (seq_out), // previous src data out
        stream pixel_type dst_stm (seq_out)  // destination stream
);
``` where
    offset is an optional branch delay equalization input described in the Advanced Topics section.
    line0 is the vertical position of the first line of the source strip within the overall image. This can be negative or larger than the lines argument.
    lines is the number of scan lines in the frame.
    words is the width of the input stream in number of words.
    src_stm is the source stream with image data loaded one scan line per processor.
    dst_stm is the destination stream
    prv_stm is the previous source stream in.
    nxt_stm is the previous source stream out
Note: prv_stm and src_stm together provide 2*N lines of vertical context.

In general, all streams are typically accessed in a sequential fashion. Often, when used in a pipeline, the argument provided to prv_stm and nxt_stm will be the same stream and the argument provided to src_stm and dst_stm will be the same stream. In this way, chained kernels in a pipeline seem to progressively transform the same area of local memory while rotating a delayed version of the source stream through their private history buffers. However, note, there is a tradeoff between sharing strip allocations in local memory versus parallelism of DMA transfers and kernel execution.

Kernels, with the exception of slave kernels, maintain any additional required vertical context by making copies of the source strip in local memory for use in the next call. So, typically, each processor will have convenient access to a vertical context of N previous scan lines by accessing data in either the current or previous strip in its own or a peer's local memory. More complex kernels may require more than one previous history strip. By making kernels responsible for providing their own additional vertical context, it becomes much easier to swap kernels in and out of pipelines with little effect on other kernels.

Figure 5:
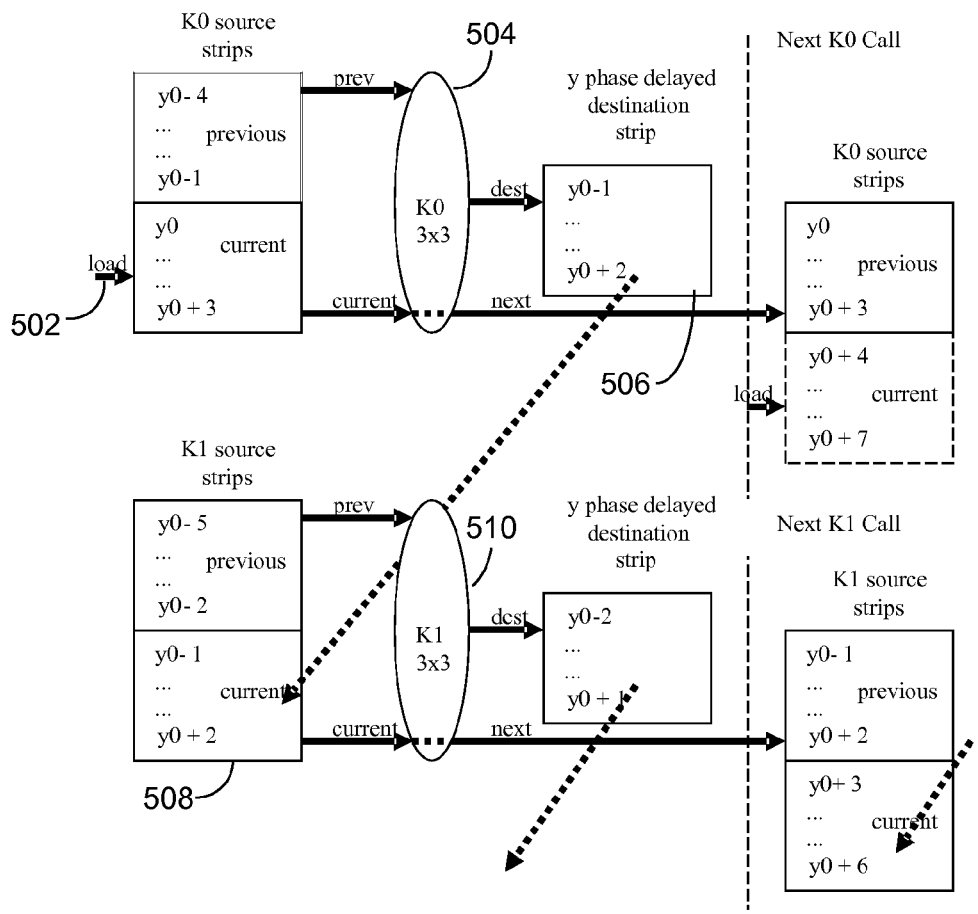
FIG. 5 illustrates one embodiment of source image strips being loaded along with corresponding chained kernels.

As an example, and referring now to FIG. 5, for each source strip loaded, such as at 502, each chained kernel is called once, at 504. Kernel K0 produces a y delayed destination strip, at 506, and copies the current source strip to its next output, at 508. This will become the previous K0 source strip the next time K0 is called. Kernel K0's destination strip becomes the current source strip for the chained K1 kernel which is called next, at 510.

Figure 6:
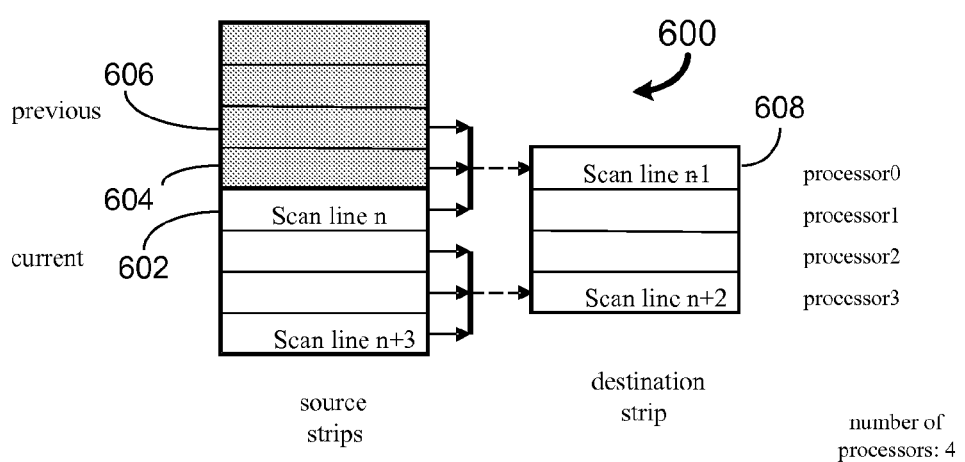
FIG. 6 illustrates one embodiment of source strip filtering to arrive at destination image strips.

Generally speaking, each kernel will introduce some minimum vertical phase delay. Referring to FIG. 6, a 3×3 filter 600 uses the current scan line, at 602, with two previous lines, at 604 and 606, producing an output scan line at 608 that is centered on the previous scan line. So the minimum vertical phase delay is 1. The output strip for this filter will have a line0 associated with it that is one less than the source strip's line0 value. When the next kernel in the chain reads this strip, this new value of line0 will be provided.

The following example of a kernel implementing a 3×3 filter illustrates use of the row tap API, described earlier, to simplify accessing the vertical filter taps.

```
1   typedef struct row_tap_3_t_ {
2       int t1; // top tap
3       int c0; // center tap
4       int b1; // bottom tap
5   } row_tap_3_t;
6
7   // Separable 3×3 filter
8   kernel void filter_3x3_pl1_rpl(
9       int offset (in), // additional vertical offset beyond 1
10      int line0 (in),
```

-continued

```
11    int     lines (in),
12    int     wrds (in), // strip width in words
13    stream int   cur_stm(seq_in),
14    stream int   prv_stm(seq_in),
15    stream int   nxt_stm(seq_out),
16    stream int   dst_stm(seq_out) )
17    {
18        vec row_tap_3_t    ctl0;
19        vec row_tap_3_t    ctl1;
20        vec row_tap_3_t    taps;
21
22        vec int hor_l1, hor_c0, hor_r1;
23        int             cycles = wrds-1;
24        int             cycle = 0;
25        vec int            cur;
26        vec int            prv;
27        vec int            val;
28
29        row_tap_3_init_controls (offset, line0, lines, ctl0, ctl1);
30
31        spi_read( cur_stm, cur);
32        spi_read( prv_stm, prv);
33        spi_write(nxt_stm, cur);
34        taps = row_tap_3_get_taps (ctl0, ctl1, prv, cur);
35        hor_c0 = filter_3_getVerResult (taps);
36
37        // replicate 1 at left side
38        hor_l1       = spi_vshuffleu(0x00000000, (vec uint32.times.1)
                          hor_c0, 0);
39
40        while (cycle < cycles)
41        {
42            spi_read( cur_stm, cur);
43            spi_read( prv_stm, prv);
44            spi_write(nxt_stm, cur);
45            taps    = row_tap_3_get_taps(ctl0, ctl1, prv, cur);
46            hor_r1      = filter_3_getVerResult(taps);
47
48            val    = filter_3_getHorResult_pl1(hor_l1, hor_c0,
                          hor_r1);
49
50            // Shift horizontal context left
51            hor_l1 = hor_c0;
52            hor_c0 = hor_r1;
53
54            spi_write(dst_stm, val);
55            cycle = cycle + 1;
56        }
57
58        hor_r1          = (vec int16.times.2) spi_vshuffleu(0x03030303,
                          hor_c0, 0);
59        val    = filter_3_getHorResult_pl1(hor_l1, hor_c0, hor_r1);
60        spi_write(dst_stm, val);
61    }
```

The initialization inline kernel: row_tap__3_init controls, specified in the exemplary code above, is called once on entry and uses offset, line0 and lines to compute 2 control structures: ctl0 and ctl1. Each control structure has 3 elements corresponding to the 3 vertical taps. Each control tap is actually a vector of N values. These control taps incorporate all the special top and bottom effects. That is, offset, line0 and lines are not used anywhere else in the kernel.

row_tap__3_init_controls is generic and can be used by any 3 high filter.

Once the control structures have been initialized, they can be used by the row_tap__3_get_taps inline kernel, shown in the code above, to extract a set to taps from vertical context of 2*N lines represented by prv_stm and cur_stm. In this case, get_taps is called once before the loop and then once for each loop cycle. Since row_tap__3_get_taps just returns the taps, it is also generic and may be used by any 3 high filter. The row_tap api includes these inline kernels for all odd sizes from 3 to N-1. The particular weighting function specific to this kernel is isolated in two inline calls:
    filter__3_getVerResult(taps);
    filter__3_getHorResult_pl1(hor_l1, hor_c0, hor_r1

The number of get taps necessary in the preamble before the loop, and therefore, the number of replication steps in the section after the loop, is a function of how many taps are used by the filter and whether pixels are planar or pixel packed. The next history stream, nxt_stm, is updated every time the source, cur_stm, is read.

The row_tap API assumes that the behavior beyond the top and bottom image edges is to replicate the boundary pixels. Since kernels are provided with the vertical position for their source strips as well as the number of scan lines in the overall frame, they can properly handle required neighbors that are above or below the image boundary, for instance, replicated data from the top or bottom scan line, or generating pixels outside the top and bottom image boundaries within kernel functions by passing the current line number and the total number of lines in the image to the kernel.

Kernels are written such that they process their strips as if the strip represented the full width of the image, even though this is often not the case. This usually means the source data is internally replicated by the kernel at the beginning and end of the processing call to fill in missing context at the edges. This strategy removes the necessity of communicating and implementing different edge cases to the kernel with very little additional processing cost. In the example, this is implemented in lines 38 and 58. This behavior can readily be changed by modifying, for instance, if a constant pixel color is required outside image boundaries.

The kernel produces a strip with a width that is equal to the source by reading ahead one word and replicating it for the initial left horizontal context. The loop then produces all but the last result. The last output is produced after replicating the last horizontal context result.

Full width processing of partial width strips is handled such that no horizontal phase error is introduced. The output strip should not be shifted either left or right relative to the source.

Note that there are only a few lines of code unique to the particular 3×3 filter described above in lines 35, 46 and 48. Interestingly, a new 3×3 filter could be created very quickly using this one as a template. Only the filter__3_getHorResult_pl1 and filter__3_getVerResult functions need to be replaced with two new functions in order to generate a completely different 3×3 kernel.

Similarly, this kernel implementation assumes that the filter is separable, which means that the pixels can be filtered using a dot-product in one dimension and then the results filtered using a dot-product in the other dimension. This is possible when the 3×3 filter matrix is symmetric. A full matrix multiply can readily be employed instead by modifying the kernel code.

In some embodiments, performance optimizations may be applied to the basic methods presented above. For example, when handling large image sizes, access to sufficient external memory may be constrained. In such cases, the pipelines may be configured such that the external memory buffers only represent a small horizontal slice of the overall frame. After each strip column is processed, the local memory previous strip history for each kernel is saved to external memory. Then, when the next buffer arrives, the history is restored before processing of that column begins. The history load and stores use the same strip column parameters as the primary image load and stores.

Since source strips overlap between columns, two separate buffers in external memory are used to save and restore history streams. After processing all columns, the buffers need to be swapped in preparation for the next call. Also, each external memory carries two additional parameters:

frame_lines: the number of scan lines in some larger overall frame.
frame_line0: the first scan line in the current buffer Then, for each strip column, the scan line loop limits are:
line0=frame_line0;
line1=MIN(frame_line0+height, frame_lines+delay);
which is also available as:
line1=image_get_frame_line1(image, delay);

The six coded statements below provide an example to add the capability to deal with incremental buffers:

```
void
foobar_incremental_pipe(
        kernel_state_t foo,
        kernel_state_t bar,
        image_t src,
        image_t dst)
{
    int strip_width_max = 1000;
    int context_width = kernel_state_get_context_width(foo) +
                        kernel_state_get_context_width(bar);
    int context_height = kernel_state_get_context_height(foo) +
                         kernel_state_get_context_height(bar);
    strip_column_t column = strip_column_new(
                        image_get_width(src),
                        strip_width_max,
                        context_width
                        );
    int lines  = image_get_frame_lines(src);
    int line0  = image_get_frame_line0(src);
    int line1  = image_get_frame_line1(src, context_height);
    int line;
    strip_t tmp_strip = strip_new(column, lines);
    kernel_state_set_history_strip(foo, strip_new(column,
    NUM_LANES));
    kernel_state_set_history_strip(bar, strip_new(column,
    NUM_LANES));
    while (column_valid(column))
    {
        kernel_state_load_history(foo);
        kernel_state_load_history(bar);
        for (line=line0; line<line1; line=line+NUM_LANES)
        {
            strip_load( tmp_strip, src, line0);
            foo_function( foo, tmp_strip, tmp_strip);
            bar_function( bar, tmp_strip, tmp_strip);
            strip_store( tmp_strip, dst);
        }
        kernel_state_store_history(foo);
        kernel_state_store_history(bar);
        strip_column_next(column);
    }
    kernel_state_done(foo);
    kernel_state_done(bar);
    strip_free(tmp_strip);
    strip_free(kernel_state_get_history_strip(foo));
    strip_free(kernel_state_get_history_strip(bar));
    strip_column_free(column);
}
```

Branching of the kernel processing graph occurs when a kernel produces multiple output strips or the same output gets used by different kernels. Conversely, two or more branches of a processing graph are joined when they are used by the same kernel. For joins, vertical phase alignment must be considered.

Figure 7:
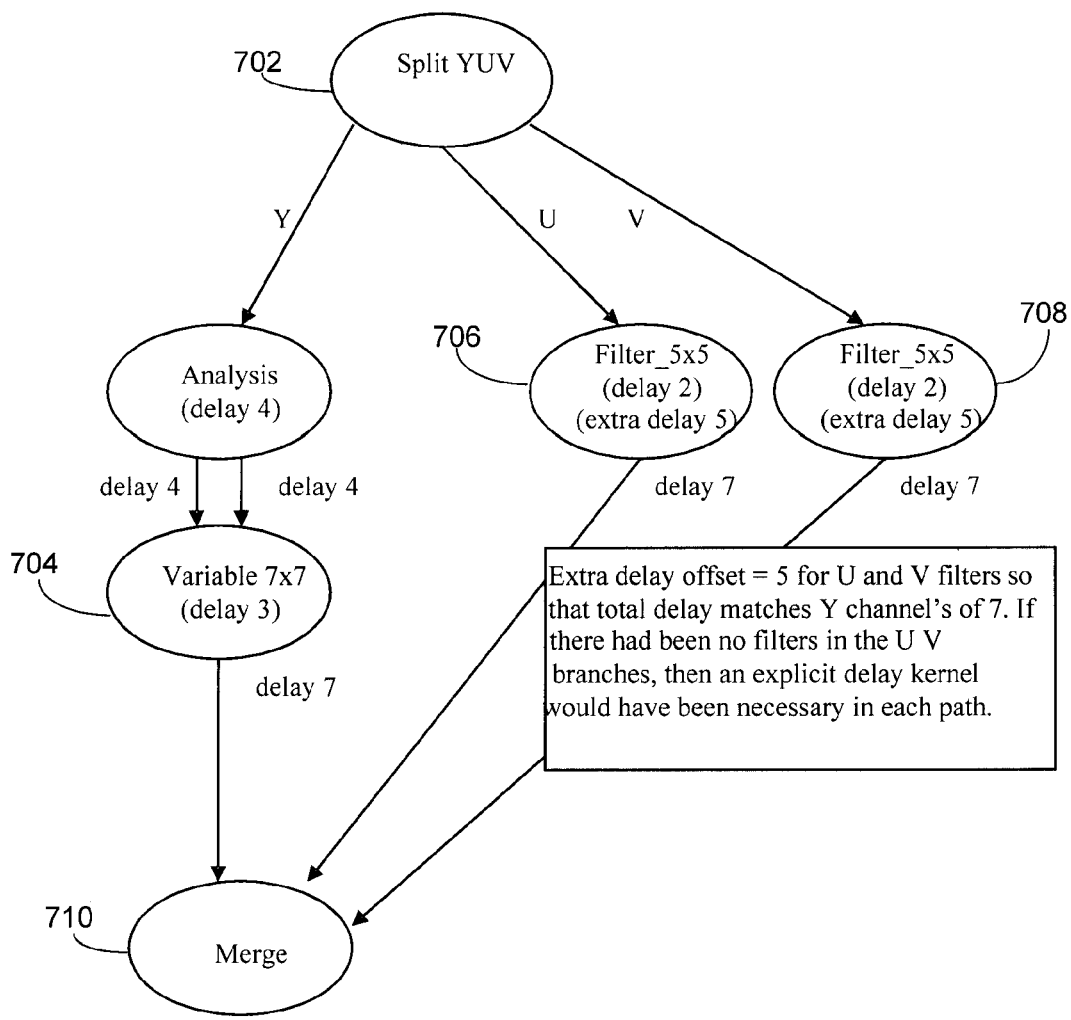
FIG. 7 illustrates one embodiment of a branch delay equalization method.

Kernels usually have an additional input (offset) that allows additional vertical delay to be introduced so that the delays of parallel branches in processing graphs can be easily equalized. This offset is assigned a positive number less than or equal to some kernel dependent limit. For kernels using only one history stream, this limit is: N+1−filter_height. FIG. 7 illustrates branching of output strips Y, U and V, at 702. Various delays may be employed, such as at 704, 706 and 708, to equalize the delays resulting from the branching. In the example of FIG. 7, the equalized branches are then merged, at 710.

Kernels that input multiple source strips are usually written assuming that there is zero vertical phase difference between their inputs. Branch delay equalization, mentioned above, can be used to make this happen. In some cases, as an optimization, this delay equalization may be effectively accomplished in the joining kernel. If neither of these is possible, the addition of an explicit delay kernel may be required. A delay kernel is a very simple 1×1 copy filter that maintains a history strip and has the offset input that can then be used to increase the delay from 0.

One of the two ways branching can occur involves using a strip by two or more kernels. If more than one of the kernels inputting the strip is a filter requiring context, they would each normally maintain a private history of the input. Since these private copies would be identical, all but one is redundant. To optimize this case, one of the kernels is designated as the master, and the other filters are replaced with slave versions of their kernel. These slaves are given the master's copy of the previous source as their prv_stm input. A slave kernel is identical to a master except that the input argument nxt_stm is missing and internally, the write to nxt_stm is not present. The only other requirement is that all the slaves are called before the master, which then updates the history strip.

Although, nominally, input and output strips are the same size, some operators may change the width. An x and y scaling operation changes the strip width. The strip height, however, is maintained at N by sometimes not producing an output strip (scaling down in y) or not requiring another input strip before producing the next output strip (scaling up in y).

Scaling is one of the more complex cases since most of the time, some amount of filtering is also involved. Sometimes the filtering is easily factored out. For instance, scaling down by 2 might involve filtering by a 3×3 filter using one kernel and the selecting (nearest neighbor) every other pixel/scan as the output with another. Both kernels would need history strips. The second kernel's history strip is needed so that there is enough source data (2N scan lines) to produce the N scan lines of one output strip. Although perhaps the most convenient, this approach would not be the most efficient since ¾ths of the 3×3 filter's work is being thrown away by the $2^{nd}$ kernel. A more efficient implementation might try to incorporate the x scaling this into the filter so that it only did the work for half the pixels in x. This would leave only the Y nearest neighbor 2:1 scaling to the second kernel. A further optimization might just do the entire filter scale operation in one kernel. This implementation would be the most efficient although two history strips would still be required.

Whether or not filtering is built into the scaling kernel, the following inner pipeline loop pseudo code shows how a generic enlarging or reducing scale kernel can be inserted in a set of chained kernels using this methodology. Since all kernels continue to operate on strips, the only change to the kernels after scaling will be to the strip width argument passed in. Exemplary pseudo code reads:

```
foreach strip {
    <first_segment_of_pipeline>
    scaled_strips = <compute_number_of_scaled_output_strips>
```

-continued

```
    do {
            scale(scaled_strips,...) // >0 output, <2=>update
            if (scaled_strips ==0) break;
            scaled_strips -=1;
            <last_segment_of_pipeline>
        }
}
```

The scale kernel takes an additional argument, scaled_strips, which is the number of output strips that the scale kernel will be able to produce given the source strip being passed in from the first_segment_of_pipeline. For reduction scaling, this may be zero. For enlargement, this may be greater than 1. Whatever additional vertical context the scale kernel needs is maintained by it when it updates its history strip(s). The scale kernel will produce a new output strip if scaled_strips is greater than zero. It will update its history strip(s) if scaled_strips is less than two. To allow for use of strip columns and incremental buffers, the scale kernel is restartable at sub pixel precision x and y offsets.

The disclosure above provides numerous examples to support the RPL method presented herein. In some embodiments, the constraints and methodical procedures presented in this discussion for kernel and pipeline implementations may be encoded into a computer program (i.e., compiler). For instance, a straightforward language may be employed for specifying the key parameters for each kernel and for specifying how kernels are sequenced in a processing graph. A compiler would take these and map them to a pipeline, or find the performance optimal grouping of the processing graph into one or more pipelines.

As described above, the image processing kernels generated using the method presented here result in a straightforward templatized implementation. This means that multiple kernels can be combined into a single kernel using a formulaic approach, and can even be encoded into a compiler. This could help reduce the invocation overhead inherent for a series of kernels that each only perform limited processing, such as point operations.

With regard to the description provided, some embodiments described herein may be implemented through use of programmatically implemented steps or sub-steps. As used herein, programmatically is intended to mean through the use of code, or computer-executable instructions. A programmatically performed step may or may not be automatic.

Still further, some embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

The invention claimed is:

1. A method for processing image data, the method comprising:
    processing, by a multi-lane processor, a plurality of image strips, in a pipeline implementation, each of the plurality of image strips formed of a group of consecutive rasters within the image data, wherein a vertical stack of image strips from among the plurality of images strips forms a strip column, and the image data comprises a plurality of strip columns;
    executing a plurality of kernels on the multi-lane processor according to the pipeline implementation; and
    defining overlapping regions between adjacent strip columns from among the plurality of strip columns in the image data, wherein an amount of overlap corresponds to an amount of horizontal context requested by the plurality of kernels in the pipeline implementation.

2. The method of claim 1, further comprising:
    repeating the processing for different image strips from among the plurality of image strips within the plurality of strip columns, so as to process an entire strip column, and for different strip columns across the image, as necessary, so as to process the entire image data.

3. The method of claim 1, wherein the multi-lane processor includes multiple lanes and local memory associated with each of the multiple lanes, the method further comprising:
    receiving source image data from memory that is non-local relative to the multiple lanes;
    storing, in the local memory associated with each of the multiple lanes, corresponding intermediate data, wherein the processing includes processing the intermediate data; and
    storing, in the memory that is non-local relative to the multiple lanes, output image data that is generated in response to the processing.

4. The method of claim 1, wherein the group of consecutive rasters within the image data comprises a group of N consecutive rasters, and the method further comprises:
    mapping the group of N consecutive rasters within the image data to N lanes of the multi-lane processor.

5. The method of claim 4, wherein the processing further comprises:
    processing an image strip from among the plurality of image strips, wherein the image strip is formed of the group of N consecutive rasters within the image data, and wherein a vertical stack of image strips from among the plurality of image strips forms a corresponding strip column from among the plurality of strip columns; and
    processing each of the N consecutive rasters by advancing the processing, from left to right across the image strip, within each of the respective N lanes, wherein different rasters of the image strip are processed in different lanes of the multi-lane processor in parallel.

6. The method of claim 5, wherein the processing further comprises:
processing the image strip in a sequence of image processing functions configured to execute on the multi-lane processor according to the pipeline implementation;
the pipeline implementation looping over portions of the image data in multiple iterations;
processing intermediate data in response to the sequence of image processing functions;
storing the intermediate data in local memory associated with each of multiple lanes of the multi-lane processor; and
executing, by the plurality of kernels, the sequence of image processing functions according to the pipeline implementation.

7. The method of claim 1, wherein a raster from among the group of consecutive rasters represents a line segment in the image data.

8. The method of claim 1, wherein the consecutive rasters represent vertically consecutive line segments in the image data.

9. The method of claim 1, wherein a number of consecutive rasters for each of the plurality of image strips corresponds to a number of lanes of the multi-lane processor.

10. The method of claim 1, wherein an output of one kernel from among the plurality of kernels directly feeds an input of another kernel from among the plurality of kernels.

11. The method of claim 1, further comprising:
maintaining vertical state for each of the plurality of kernels in the pipeline implementation from one image strip from among the plurality of image strips to a subsequent image strip from among the plurality of images strips within a strip column from among the plurality of strip columns by selectively providing at least one private history strip to each of the plurality of kernels in the pipeline implementation.

12. The method of claim 11, wherein maintaining the vertical state further comprises storing at least one of context width information and context height information associated with the at least one private history strip.

13. The method according to claim 1, further comprising:
chaining image processing functions by passing the plurality of image strips directly from one function to a subsequent function in a sequence of functions implemented by the plurality of kernels using local memory that is associated with each of multiple lanes of the multi-lane processor, and without any intermediate transfers of the plurality of image strips to memory that is non-local relative to the multiple lanes.

14. The method according to claim 1, further comprising:
traversing the image data by first processing the plurality of image strips from top to bottom in a left-most strip column from among the plurality of strip columns, and then progressing to each adjacent unprocessed strip column from among the plurality of strip columns.

15. A non-transitory computer-readable medium including instructions executable by a multi-lane processor for processing image data, the instructions comprising:
instructions to process, by the multi-lane processor, a plurality of image strips, in a pipeline implementation, each of the plurality of image strips formed of a group of consecutive rasters within the image data, wherein a vertical stack of image strips from among the plurality of images strips forms a strip column, and the image data comprises a plurality of strip columns;
instructions to execute a plurality of kernels on the multi-lane processor according to the pipeline implementation; and
instructions to define overlapping regions between adjacent strip columns from among the plurality of strip columns in the image data, wherein an amount of overlap corresponds to an amount of horizontal context requested by the plurality of kernels in the pipeline implementation.

16. The non-transitory computer-readable medium of claim 15, further including:
instructions to maintain vertical state for each of the plurality of kernels in the pipeline implementation from one image strip from among the plurality of image strips to a subsequent image strip from among the plurality of images strips within a strip column from among the plurality of strip columns by selectively providing at least one private history strip to each of the plurality of kernels in the pipeline implementation.

17. The non-transitory computer-readable medium of claim 16, wherein the instructions to maintain the vertical state further comprise:
instructions to store at least one of context width information and context height information associated with the at least one private history strip.

18. An apparatus configured to process image data, the apparatus comprising:
a multi-lane processor including multiple lanes; and
a non-transitory computer-readable medium including instructions executable by the multi-lane processor to configure the multi-lane processor to:
process a plurality of image strips, in a pipeline implementation, each of the plurality of image strips formed of a group of consecutive rasters within the image data, wherein a vertical stack of image strips from among the plurality of images strips forms a strip column, and the image data comprises a plurality of strip columns;
execute a plurality of kernels on the multi-lane processor according to the pipeline implementation; and
define overlapping regions between adjacent strip columns from among the plurality of strip columns in the image data, wherein an amount of overlap corresponds to an amount of horizontal context requested by the plurality of kernels in the pipeline implementation.

19. The apparatus of claim 18, wherein the instructions further configure the multi-lane processor to:
maintain vertical state for each of the plurality of kernels in the pipeline implementation from one image strip from among the plurality of image strips to a subsequent image strip from among the plurality of images strips within a strip column from among the plurality of strip columns by selectively providing at least one private history strip to each of the plurality of kernels in the pipeline implementation.

20. The apparatus of claim 19, wherein the instructions further configure the multi-lane processor to:
store at least one of context width information and context height information associated with the at least one private history strip.

* * * * *